United States Patent Office 3,359,327
Patented Dec. 19, 1967

3,359,327
HALOGENATED ETHER ALCOHOLS
Carleton W. Roberts and John C. Little, Midland, Mich., assignors to The Dow Chemical Company, Midland, Mich., a corporation of Delaware
No Drawing. Filed Nov. 14, 1966, Ser. No. 593,689
8 Claims. (Cl. 260—611)

The present specification and claims constitute a continuation-in-part of applications Ser. Nos. 191,752 and 191,753, both filed May 2, 1962, and both continuations-in-part of application Ser. No. 808,588 filed Apr. 24, 1959 and all now abandoned.

This invention, that of, jointly, Carleton W. Roberts of 211 Sinclair St. and John C. Little, 3903 Chestnut Hill Drive, both of Midland, Mich., relates to new and useful halogenated ether alcohols, and more particularly to compounds having the formula

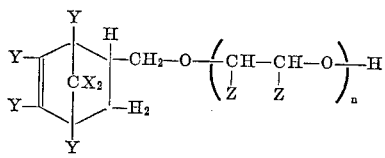

wherein X represents a halogen of atomic weight less than 100 and Y represents halogen of atomic weight of 25 to 100, one Z represents hydrogen or loweralkyl and the other Z represents hydrogen, wherein loweralkyl designates alkyl of from 1 to 4, both inclusive, carbon atoms, and $n$ is an integer from 1 to 10, inclusive.

These new compounds may be prepared by the Diels-Alder diene synthesis. The synthesis may be carried out by causing a reaction between a hexahalocyclopentadiene of the formula:

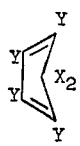

wherein X and Y have the values hereinbefore stated, as the diene, and as dienophile, an allyloxyether, typically, an omega-allyloxyether of a glycol or polyglycol of the formula:

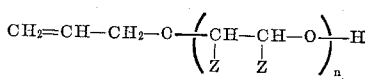

wherein $n$ has the value hereinbefore stated, to obtain the adduct product. The reactants are consumed in equimolecular amounts, and, efficiently, such amounts may be supplied to the reaction. It is advantageous but not necessary to use an inert reaction medium, such as xylene, hexane, heptane, octane, nonane, petroleum ether, benzene, toluene, cumene, ethylbenzene, diethylbenzene, ethyltoluene, chloroethylbenzene, chloroxylene, and the like, of which the boiling serves to control the reaction temperature. The reaction may be carried out at any temperature from about 60° C. to about 200° C., but is preferably carried out at about 140° C. to 160° C. A reaction mixture of the reactants, and inert reaction medium, if employed, may be brought together in a reaction vessel, and the reactants caused to react by heating at a reaction temperature. Some amount of product is formed immediately. When product is desired in good yield, the reaction is heated within the preferred temperature range, conveniently by refluxing from about 1 to about 60 hours, preferably from 2 to 20 hours, to obtain the desired product. To recover the desired halogenated ether alcohol product, the mixture resulting from reaction is distilled at a subatmospheric pressure, such as about 100 mm., to remove the liquid reaction medium. This results in a product usually of acceptable purity. However, the product may be further purified by distillation at a lower pressure, such as about 0.2 mm., to obtain the halogenated ether alcohol product in very nearly complete purity.

Allyloxyethers of glycols which are suitable starting materials include, for example, 2-allyloxyethanol; 1-allyloxy-2-propanol, (propylene glycol allyl ether), 2-allyloxy-3-propanol, 1-allyloxy-2-butanol; decabutylene glycol allyl ether; pentabutylene glycol allyl ether, hexapropylene glycol allyl ether, decapropylene glycol allyl ether, 2-(2-allyloxyethoxy)ethanol (which is also called diethylene glycol allyl ether), mixed polyethylene glycol allyl ethers having from 2 to about 10 ethoxy units, decaethylene glycol allyl ether and the like. The designation omega is used to indicate that the allyl etherification and the heptenyl-methoxy etherification derived from it is through an oxygen atom attached to a terminal carbon of a polyethylene glycol chain.

A second method of preparation of the present compounds is available. In this second method a reaction is caused between a hexahalocyclopentadiene and 1-bromo-2-propene (allyl bromide) or 1-chloro-2-propene (allyl chloride) to obtain the 5-(halomethyl)hexahalonorbornene compound of the formula

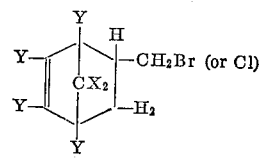

which is then caused to react with a monoalkali metal salt of a glycol

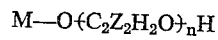

wherein M is an alkali metal and Z and $n$ have the values hereinbefore defined. The alkali metal salt of the glycol can be prepared in situ as it is consumed by combining the said heptenylhalide compound and the glycol in the presence of an amount of alkali metal as metal or as hydroxide, carbonate, or bicarbonate of alkali metal.

The reaction takes place essentially only with the halogen on the acyclic methylene group. This preference is related to the molecular structure, because the reaction is successfully carried out using either the bromine- or chlorine-containing intermediate which, with a glycol or alkali metal glycolate, reacts essentially exclusively at the halogen on the said acyclic methylene group, despite the presence of six other halogen atoms in the molecule. Allyl iodide may also be used and the heptenyl iodide intermediate can be used. The brominated compound is preferred in at least laboratory procedures.

This procedure has the advantage of obviating need for the allyl glycol ether starting materials, but such limitations as two-step preparation, more possibility of difficulty of purification of products and so forth.

The present invention may be further illustrated but is not to be construed as limited by the following examples:

EXAMPLE I

Preparation of 2-(1,4,5,6,7,7-hexachlorobicyclo[2.2.1]-5-hepten-2-ylmethoxy)ethanol A mixture of 272 grams (1.0 mole) of hexachlorocyclopentadiene, 116 grams (1.0 mole) of 1-allyloxy-2-ethanol, and 500 milliliters of heptane as reaction medium is placed in a one liter, round-bottomed flask equipped with a reflux condenser, and heated to boiling under reflux for about 60 hours. The heptane is then removed by distillation and the desired product, named in the headnote of this example collected at 165° C.–168° C. at 0.25 to 0.35 mm. of mercury pressure absolute. The yield is about 293 grams (72 percent of theoretical based on conversion of starting materials). The index of refraction $n_D^{25°\text{ C.}}$ is 1.5446.

EXAMPLE II

*Preparation of 2-(2-(1,4,5,6,7,7-hexachlorobicyclo [2.2.1]-5-hepten-2-ylmethoxy)ethoxy)ethanol*

A mixture of 146 grams (1 mole) of 2-(2-allyl-oxyethoxy)ethanol (diethylene glycol, omega-allyl ether), 272 grams (1 mole) of hexachlorocyclopentadiene, and 500 ml. of o-xylene as liquid reaction medium is refluxed at 144° C. for 20 hours. Fractionation of the resulting mixture gives 315 grams of 2-(2-(1,4,5,6,7,7-hexachloro-bicyclo [2.2.1]-5-hepten-2-ylmethoxy)ethoxy)ethanol of the formula:

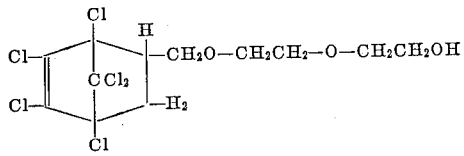

a yellow liquid boiling at 185° C. under 0.2 millimeters mercury pressure, absolute, and having a molecular weight of 419. The index of refraction, $n_D^{25°\text{ C.}}$ is 1.5335. The yield is 75 percent of the theoretical based on conversion of hexachlorocyclopentadiene.

Upon analysis the product was found to have contents of carbon and hydrogen, of 34.40, and 3.37, percent respectively as compared with theoretical values of 34.29 and 3.43, respectively.

EXAMPLE III

In a manner similar to that of Example II, other omega-allyloxy polyethylene glycol ethers are reacted with hexachlorocyclopentadiene in the presence of an inert hydrocarbon reaction medium. In representative preparations, omega-allyloxypentaethylene glycol is reacted with an equimolecular amount of hexachlorocylopentadiene to obtain an oily, dark yellow liquid of the formula:

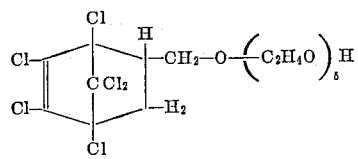

EXAMPLE IV

Hexabromocyclopentadiene is reacted with an excess of the allyl ethers of an industrial mixed polyethylene glycol having an average molecular weight of about 230 to obtain an oily product, a mixture of compounds similar to the foregoing but having bromine as hexahalo substituent and variously from 2 to 14 recurring oxyethylene groups in the alcoholic side chain; upon analysis the relative abundance of various oxyethylene groups in the side chains is found to be similar to that in the starting mixed allyloxypolyethylene glycol, but with a somewhat higher proportion of moieties of lower molecular weight.

Also, hexabromocyclopentadiene is reacted with the omega-allyl ether of decapropylene glycol to obtain a decaethylene glycol 1,4,5,6,7,7-hexabromobicyclo [2.2.1]-5-hepten-2-ylmethyl ether product. In one widely accepted system of nomenclature this compound is named 1-(1,4,5,6,7,7-hexabromobicyclo [2.2.1]hept-5-en-2-yl)-2,5,8,11,14,17,20,23,26,29-decaoxahentricontane-31-ol. Also the reaction of decaethylene glycol allyl ether with hexachlorocyclopentadiene is carried out as in Example I. The resulting decaethylene glycol 1,4,5,6,7,7-hexachlorobicyclo [2.2.1]-5-hepten-2-ylmethyl ether product is purified by dilution with acetone, passing the acetone solution through a bed of activated carbon black, and subsequent distillation in a molecular still. The product has a molecular weight of 771.4 and is a very viscous, straw-colored liquid having a refractive index $n_D^{25°\text{ C.}}$ of 1.4798. The product is a decaethylene glycol 1,4,5,6,7,7-hexachlorobicyclo [2.2.1]-5-hepten-2-ylmethyl ether.

Also, from the reaction of 1,2,3,4-tetrachloro-5,5-difluorocyclopentadiene and omega-allyloxydipropylene glycol there is obtained a 2-(2-(1,4,5,6-tetrachloro-7,7-difluorobicyclo [2.2.1]-5-hepten-2-ylmethoxy)ethoxy)-ethanol.

Also from the reaction of the octaethylene glycol allyl ether and 1,2,3,4-tetrachloro-5,5-dibromocyclopentadiene there is obtained an octapropylene glycol 1,4,5,6-tetrachloro - 7,7 - dibromobicyclo [2.2.1]-5-hepten-2-ylmethyl ether.

From the reaction of 1,2,3,4-tetrabromo-5,5-difluorocyclopentadiene and the mixed polyethylene glycol starting material of Example IV, there is obtained a mixed polyethylene glycol 1,4,5,6-tetrabromo-7,7-difluorobicyclo [2.2.1]-5-hepten-2-ylmethyl ether product.

EXAMPLE V

*Preparation of 1-(1,4,5,6,7,7-hexachlorobicyclo[2.2.1]-5-hepten-2-ylmethoxy)-2-butanol*

A mixture of 272 grams (1.0 mole) of hexachlorocyclopentadiene, 130 grams (1.0 mole) of 1-allyloxy-2-butanol, (butylene glycol allyl ether) and 500 milliliters of heptane is placed in a one liter, round-bottomed flask equipped with a reflux condenser, and heated at 95°–100° C. for 60 hours to prepare the present product. The heptane is removed by vaporization under subatmospheric pressure and the product thereafter collected at 163°–165° C. at 0.2 to 0.3 millimeters mercury pressure absolute. The yield is 230 grams (55 percent of theoretical based on conversion of starting materials). The product has refractive index $n_D^{25°\text{ C.}}$ of 1.5320. 1-(1,4,5,6-tetrabromo-7,7-difluorobicyclo [2.2.1]-5-hepten-2-ylmethoxy)-2-butanol is prepared in similar manner, employing 1,2,3,4-tetrabromo-5,5-difluoropentadiene-1,3 as diene and 1-allyloxy-2-butanol as dienophile.

EXAMPLE VI

*Preparation of 2-(2-(1,4,5,6,7,7-hexachlorobicyclo [2.2.1]-5-hepten-2-ylmethoxy)butoxy)butanol*

A mixture of 202 grams (1 mole) of 2-(2-allyloxybutoxy)butanol (dibutylene glycol allyl ether), 272 grams (1 mole) of hexachlorocyclopentadiene, and 500 ml. of o-xylene as reaction medium is refluxed at about 145° C. for 20 hours. Fractionation of the resulting mixture gives about 350 grams of a viscous liquid 2-(2-(1,4,5,6,7,7-hexachlorobicyclo [2.2.1]-5-hepten - 2 - ylmethoxy)butoxy)butanol of the formula

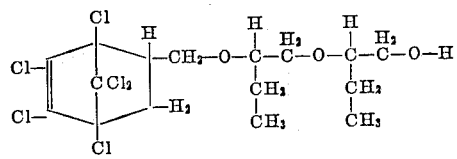

The yield is about 75 percent of the theoretical based on conversion of hexachlorocyclopentadiene.

In a manner similar to that of Example VI other allyloxy glycol ethers are reacted with a hexahalocyclopentadiene of the stated structure using any or several of various hydrocarbon and substituted hydrocarbon liquids as solvent.

A mixture of propylene glycol allyl ethers having an average molecular weight of about 430, derived from the allyl etherification of a mixture of propylene glycols having an average of 5.2 recurring glycol moieties per molecule is employed together with hexachlorocyclopentadiene in a natural solvent mixture of dichlorobenzene resulting from the dichlorination of benzene to prepare a mixed polypropylene glycol-1,4,5,6,7,7-hexachlorobicyclo-[2.2.1]-5-hepten-2-ylmethyl ether as a dark viscous liquid of which the viscosity declines with temperature increase. The product is clarified by the action of activated charcoal, and a small portion of it is distilled in a molecular still to obtain a viscous pale yellow liquid product.

In similar procedures but employing hexabromocyclopentadiene and the said polypropylene glycol allyl ether there is obtained a mixed polypropylene glycol 1,4,5,6,7,7-hexabromo bicyclo [2.2.1]-5-hepten-2-ylmethyl ether as a dark, deformable solid which is clarified from acetone solution with activated charcoal and then distilled in a molecular still, to obtain an amber glassy semi-solid.

Employing a decapropylene glycol-allylether and 1,2,3,4-tetrachloro-5,5-difluorocyclopentadiene, there is obtained a decapropylene glycol 1,4,5,6-tetrachloro-7,7-difluorobicyclo [2.2.1]-5-hepten-2-ylmethyl ether product as a viscous liquid.

Employing pentapropylene glycol-allylether and hexachlorocyclopentadiene there is obtained a decapropylene glycol 1,4,5,6,7,7-hexachlorobicyclo [2.2.1]-5-hepten-2-ylmethyl ether product.

Other allyloxyethers of ethylene glycols are reacted with the indicated hexahalocyclopentadiene in a similar manner to produce the other corresponding halogenated ether alcohols of the present invention.

Illustrative of utility in the present compounds, the compound 1-(1,4,5,6,7,7-hexachlorobicyclo [2.2.1]hept-5-en-2-ylmethoxy)-2-butanol was dispersed in water with the aid of essentially inert co-solvents and wetting agents to prepare an aqueous composition comprising 100 parts of the said compound per million parts by weight of total composition. The application of this dispersion as a drench to dormant viable seeds of the grass weeds *Setaria italica* and *Digitaria* spp. which were thereafter transferred to good growing conditions resulted in an almost complete kill of the said seeds. An aliquot of the said aqueous preparation was then diluted with further water to obtain an aqueous composition comprising 10 parts of the said compound as sole toxicant per million parts by weight of total aqueous preparation. A group of strongly growing healthy plants of *Lysimastium nummularia*, a common floating aquatic weed, was transferred to the said aqueous preparation and maintained therein for 450 hours. At the end of this time, the water plants were examined and found all to be dead whereas a check group of the same plants growing in an aqueous composition identical except that the said compound as sole toxicant had been omitted was found to be growing well and in good, healthy condition.

Similarly, complete control of a heavy infestation of seeds of the grass weed *Setaria italica* was obtained upon exposure of soil containing the said seeds to aqueous dispersions having as sole toxicant either 2-(1,4,5,6,7,7-hexachlorobicyclo [2.2.1]-5-hepten-2-ylmethoxy)ethanol or 2-(2-(1,4,5,6,7,7-hexachlorobicyclo [2.2.1]-5-hepten-2-ylmethoxy)ethoxy)ethanol in the concentration of 100 parts per million parts by weight of ultimate composition.

To make use of the valuable property of the present compounds as binder in paving asphalts whereby to bring about the more tenacious adhrence of the said asphalt to aggregate, for example gravel, it is preferred to use the products of the present invention of relatively higher molecular weight corresponding to relatively longer oxyalkylene chains. For such use, the compound is dispersed with stirring and mixing into a melted tar. Thereafter, the tar is employed in conventional procedures.

The allyl glycol ethers to be employed as starting materials in the preparation of the products of the present invention are prepared in known procedures. They are prepared conveniently, for example, in the method set forth in U.S. Patent 2,537,643 where such product was prepared and employed as an intermediate. By routine extension of the method there set forth all the other such ethers are readily prepared. The halogenated cyclopentadienes appear in, for example, U.S. Patents 2,459,783 and 3,007,958, and in the references therein cited.

We claim:
1. A compound of the formula:

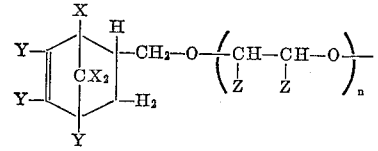

wherein X represents halogen of atomic weight less than 100, and Y represents halogen of atomic weight between 25 and 100, one Z represents hydrogen or lower alkyl and the other Z represents hydrogen, and $n$ is an integer from 1 to 10, inclusive.

2. Compound of claim 1 wherein Z is methyl and $n$ is unity, namely, 1-(1,4,5,6,7,7-hexachlorobicyclo [2.2.1]-5-hepten-2-ylmethoxy)-2-butanol.

3. Compound of claim 1 wherein Z is methyl and $n$ is 10, namely, decapropylene glycol 1,4,5,6,7,7-hexachlorobicyclo [2.2.1]-5-hepten-2-ylmethyl ether.

4. Compound of claim 1 wherein Z is ethyl and $n$ is 2, namely, 2-(2-(1,4,5,6,7,7-hexachlorobicyclo [2.2.1]-5-hepten-2-ylmethoxy)butoxy)butanol.

5. Compound of claim 1 wherein in both occurrences Z is hydrogen and $n$ is 1, namely, 2-(1,4,5,6,7,7-hexachlorobicyclo [2.2.1]-5-hepten-2-ylmethoxy)ethanol.

6. Compound of claim 1 wherein in both occurrences Z is hydrogen and $n$ is 2, namely, 2-(2-(1,4,5,6,7,7-hexachlorobicyclo [2.2.1]-5-hepten - 2 - ylmethoxy)ethoxy)ethanol.

7. Compound of claim 1 wherein in both occurrences Z is hydrogen and $n$ is 5, namely, pentaethylene glycol-omega-(1,4,5,6,7,7-hexachloro [2.2.1]-5-hepten-2-ylmethyl)-ether.

8. Compound of claim 1 wherein in both occurrences Z is hydrogen and $n$ is 10, namely, decaethylene glycol 1,4,5,6,7,7-hexachlorobicyclo [2.2.1]-5-hepten-2-ylmethyl ether.

References Cited 1,275,440  10/1961  France.

BERNARD HELFIN, *Primary Examiner.*